United States Patent [19]

Fritts

[11] Patent Number: 5,191,990
[45] Date of Patent: Mar. 9, 1993

[54] FLASH GAS VENTING AND FLAME ARRESTING APPARATUS

[75] Inventor: Donald K. Fritts, Tulsa, Okla.

[73] Assignee: BS&B Safety Systems, Inc., Tulsa, Okla.

[21] Appl. No.: 965,531

[22] Filed: Oct. 23, 1992

Related U.S. Application Data

[63] Continuation of Ser. No. 719,516, Jun. 24, 1991, abandoned.

[51] Int. Cl.$^5$ .............................................. F17D 3/00
[52] U.S. Cl. .................................. 220/88.1; 220/88.2; 220/89.2
[58] Field of Search .................... 220/88.1, 88.2, 89.1, 220/89.2

[56] References Cited

U.S. PATENT DOCUMENTS

| | | | |
|---|---|---|---|
| 223,403 | 1/1880 | Stewart | 220/88.1 X |
| 1,047,517 | 12/1912 | Harris | 220/89.2 X |
| 1,157,685 | 10/1915 | Fryer | 220/89.2 |
| 1,686,918 | 10/1928 | Monnett | 220/88.2 |
| 1,701,805 | 2/1929 | Dunn et al. | |
| 1,778,876 | 10/1930 | Weaver | |
| 2,220,720 | 11/1940 | Jett | 220/88.2 |
| 2,376,933 | 5/1945 | Moran | 183/121 |
| 2,821,991 | 2/1958 | Marx | 137/73 |
| 3,287,094 | 11/1966 | Brownell | 220/88.2 X |
| 3,841,520 | 10/1974 | Bryant et al. | 220/88 A |
| 3,903,646 | 9/1975 | Norton | 220/88.2 X |
| 4,328,901 | 5/1982 | Gunderman et al. | 220/88 A |
| 4,795,051 | 1/1989 | Ou | 220/89.2 |
| 4,909,730 | 3/1990 | Roussakis et al. | 431/346 |

*Primary Examiner*—Steven M. Pollard
*Attorney, Agent, or Firm*—Laney, Dougherty, Hessin & Beavers

[57] ABSTRACT

A flash gas venting and flame arresting apparatus for preventing damage to a closed vessel or system by flash gas formed therein. The apparatus generally includes a pressure responsive valve means for venting the flash gas and a flame arresting receptacle connected to the valve means including an elongated housing having an inlet end, sides having a plurality of flash gas exit ports therein and a closed opposite end.

14 Claims, 2 Drawing Sheets

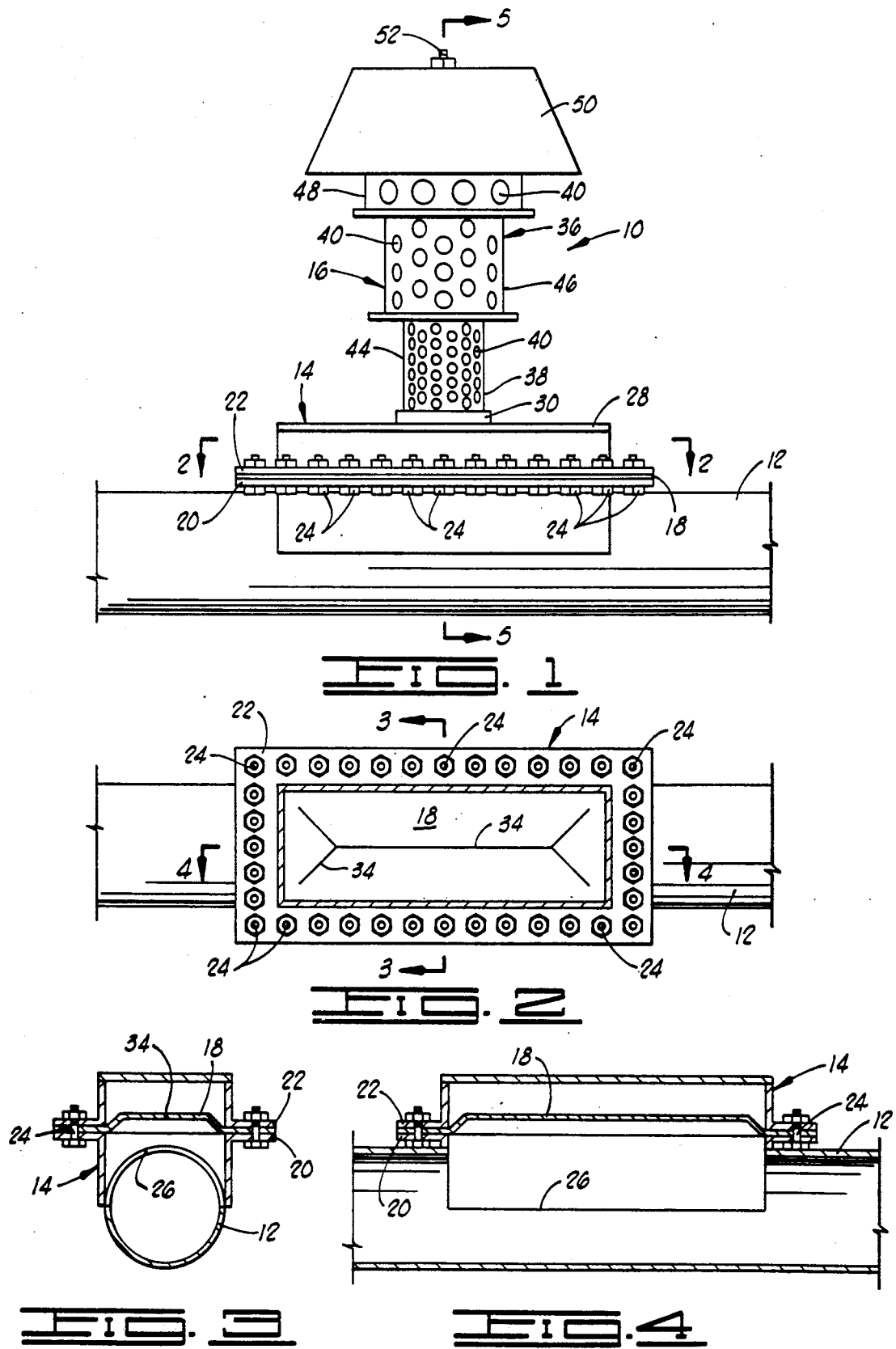

FLASH GAS VENTING AND FLAME ARRESTING APPARATUS

This is a continuation of copending application(s) Ser. No. 07/719,516 filed on Jun. 24, 1991 now abandoned.

BACKGROUND OF THE INVENTION

1. Field of the Invention

The present invention relates generally to flash gas venting and flame arresting apparatus, and more particularly, to apparatus for venting flash gas from a vessel or system and arresting the flame associated therewith.

2. Description of the Prior Art

In a variety of industrial applications, vessels and/or systems containing combustible fluids which are susceptible to spontaneous ignition are utilized. For example, vessels or systems containing air under pressure which are susceptible to hydrocarbon contamination and spontaneous ignition are common. Generally, vessels and conduit systems downstream of air compressors slowly accumulate oil therein in spite of oil filters and other safeguards being used. When the air-hydrocarbon ratio reaches a certain level, spontaneous combustion can take place which produces a flame front and the generation of hot flash gas. As a result, the pressure within the vessel or system dramatically increases causing rupture, explosions and/or other damage. The ignition of hydrocarbon-air mixtures in closed vessels or systems can be spontaneous, or it can be caused by overheating of equipment parts or the like whereby the combustible mixture is exposed to high temperatures.

While numerous safety shut-down devices have been developed and utilized for preventing the formation of combustible air-hydrocarbon mixtures in closed vessels or systems, such devices are subject to failure and/or being bypassed by operating personnel and flash gas explosions and damage have still taken place.

Thus, there is a need for apparatus which can be utilized with a vessel or system which is subject to the formation and/or the ignition of a combustible gas therein whereby in the event such a gas forms and/or ignites, the flash gas generated and flame associated therewith are vented from the vessel or system, the flame is arrested and the risk of injury to personnel and equipment is minimized.

SUMMARY OF THE INVENTION

The flash gas venting and flame arresting apparatus of the present invention fulfills the need described above. That is, the apparatus, when installed on a vessel or system, prevents damage to the vessel or system as a result of flash gas formed therein by venting the flash gas and arresting the flame associated therewith.

The flash gas venting and flame arresting apparatus of this invention basically comprises a pressure responsive valve means, e.g., a rupturable panel, connected to an outlet connection in the vessel or system for relieving pressure exerted thereon from within the vessel or system as a result of the presence of flash gas therein and for venting the flash gas from the vessel or system. A flame arresting receptacle is connected to the valve means external of the vessel or system for receiving the flash gas and arresting flame associated therewith prior to releasing the flash gas to the atmosphere or elsewhere. The flame arresting receptacle includes an elongated housing having an inlet end connected to the valve means, sides having a plurality of flash gas exit ports therein and a closed opposite end for changing the direction of flow of flash gas which impinges thereon.

It is, therefore, a general object of the present invention to provide flash gas venting and flame arresting apparatus.

A further object of the present invention is the provision of apparatus for venting flash gas and arresting the flame associated therewith from a closed vessel or system when a combustible gas therein is ignited.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of the apparatus of the present invention installed on a conduit.

FIG. 2 is a cross-sectional view taken along line 2—2 of FIG. 1.

FIG. 3 is a cross-sectional view taken along line 3—3 of FIG. 2.

FIG. 4 is a cross-sectional view taken along line 4—4 of FIG. 2.

DESCRIPTION OF PREFERRED EMBODIMENTS

Figure 5:
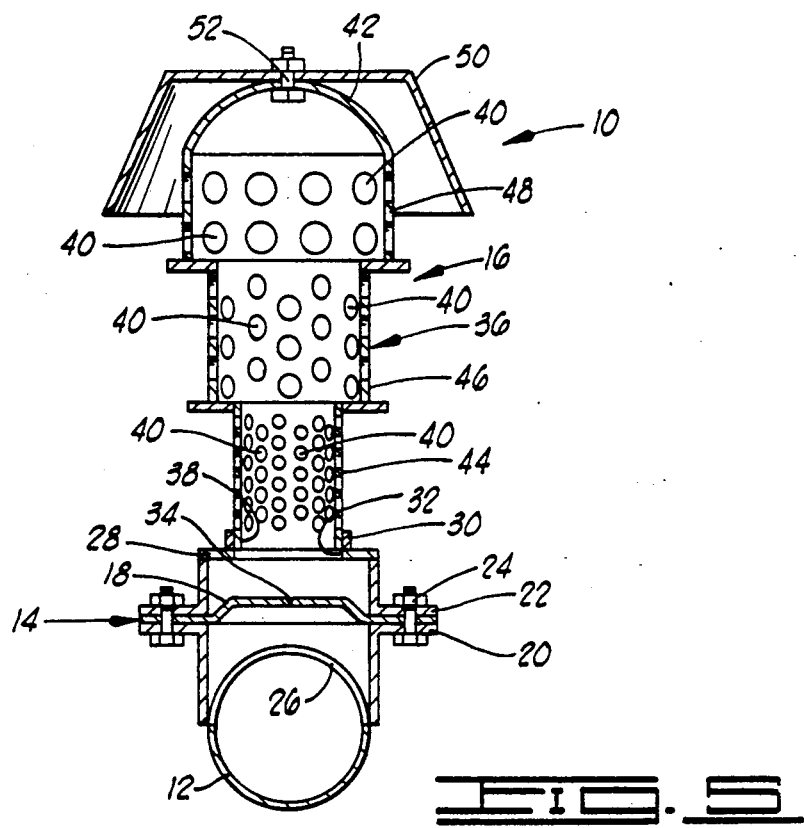
FIG. 5 is a cross-sectional view taken along line 5—5 of FIG. 1.

As mentioned above, the apparatus of the present invention functions to vent flash gas from a closed vessel or system and to arrest flame associated with the flash gas prior to releasing the gas to the atmosphere or to within a secondary enclosure for receiving the flash gas. The term "flash gas" is utilized herein to mean the burning and expanding gases developed within a closed vessel or system as a result of a combustible gas or gas mixture contained therein being ignited spontaneously or as a result of the generation of heat, sparks or the like within the vessel or system. Generally, the flash gas is preceded by a flame front which rapidly moves through the vessel or system as the pressure and temperature therein are increased dramatically.

Referring now to the drawings and particularly to FIGS. 1-5, the apparatus of the present invention is illustrated and generally designated by the numeral 10. The apparatus 10, as illustrated, is connected to a conduit 12 which is part of a closed system having the potential of containing an air-hydrocarbon or other combustible mixture or substance capable of being ignited and forming flash gas. For example, the conduit 12 can be a part of a conduit system downstream of an air compressor which is subject to containing a spontaneously ignitable air-hydrocarbon mixture.

The apparatus 10 is comprised of a pressure responsive valve means, generally designated by the numeral 14, which is sealingly connected to an opening in the conduit 12 and a flame arresting receptacle, generally designated by the numeral 16, which is connected to the valve means 14.

The valve means 14 can take various forms known to those skilled in the art, e.g., a pressure operated spring loaded relief valve, a motor valve operated by a pneumatic or electric pressure controller or other valve apparatus. Preferably, the valve means 14 is a rupturable member which ruptures when a predetermined pressure differential is exerted thereon clamped between a pair of supporting flange members as illustrated in the drawings. That is, as best shown in FIGS. 2–4, the valve means 14 is comprised of a rupturable member 18 sealingly clamped between inlet and outlet flange members 20 and 22, respectively. In the form illustrated, the flange members 20 and 22 and the rupturable member 18 include pluralities of complimentary openings formed therein, and the rupturable member and flange members are clamped together by a plurality of bolts 24 which extend through the openings. The inlet flange member 20 is sealingly attached, such as by welding, over an opening 26 in the conduit 12. The flange member 22 is closed by top plate 28 attached thereto such as by welding, and a cylindrical collar 30 is welded to the plate 28 over an opening 32 (FIG. 5) formed therein.

Figure 6:
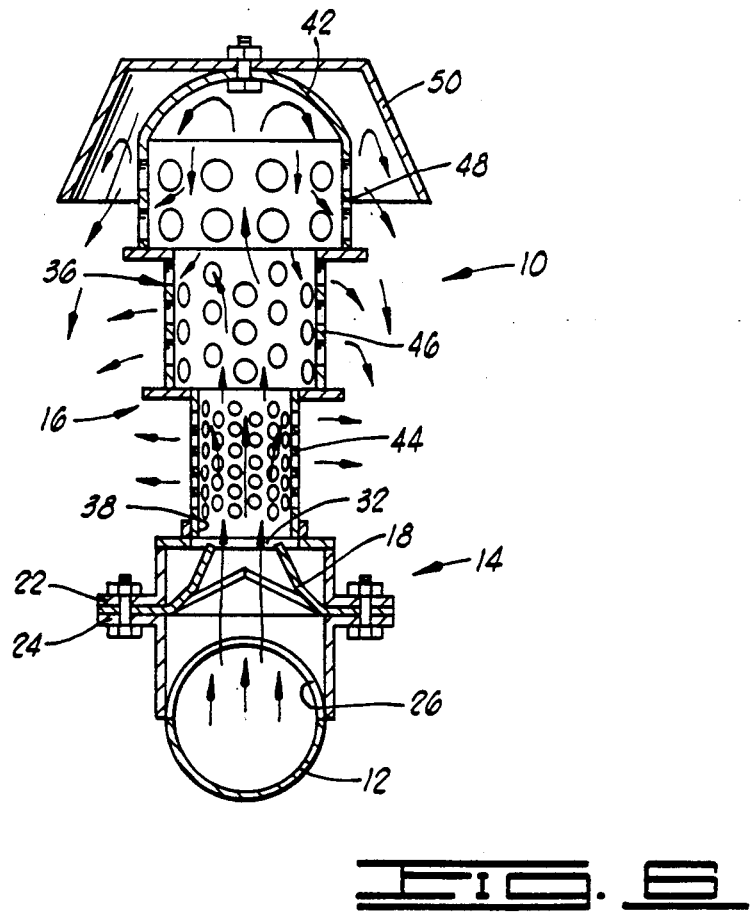
FIG. 6 is a cross-sectional view similar to FIG. 5, but showing the flow of flash gas through the apparatus after rupture of the rupture member thereof.

In the form illustrated, the rupturable member 18 is a relatively thin rectangular rupture panel having scores 34 (grooves) formed thereon which create lines of weakness therein. As is well understood by those skilled in the art, when a predetermined pressure differential is exerted on the rupture panel 18, the panel ruptures along the lines of weakness formed by the scores 34 and opens as illustrated in FIG. 6. As is further well understood, the rupture panel 18 can take any of a variety of known designs. Also, in lieu of the rupture panel 18, the rupturable member of the valve means 14 can be a rupture disk of any of the various known designs. Rupture disks are generally circular, and when used in the valve means 14, circular flanges are substituted for the rectangular flanges 20 and 22.

The flame arresting receptacle 16 includes an elongated housing 36, the inlet end 38 of which is connected to the collar 30 of the outlet flange 22. As best shown in FIGS. 1 and 5, the elongated housing 36 is preferably cylindrical and includes a plurality of flash gas exit ports 40 in the sides thereof. The end of the housing 36 opposite the inlet end 38 is closed, preferably by a curved closure member 42, e.g., an eliptical head, whereby the direction of flow of flash gas which impinges on the closure member 42 is reversed within the housing 36.

The gas exit ports 40 disposed in the sides of the elongated housing 36 preferably increase in cross-sectional area as the distance of the ports from the inlet end 38 of the housing 36 increases. Also, as shown in FIGS. 1 and 5, the internal diameter of the housing 36 preferably increases as the distance from the inlet end 38 thereof increases. In a presently preferred arrangement, the housing 36 is formed of three cylindrical sections 44, 46 and 48, the first section 44 which is connected to the outlet flange member 22 is of the smallest diameter and includes the smallest size of ports 40. The second or intermediate section 46 has a larger diameter than the section 44, is connected to the section 48 and includes larger ports 40. The section 48 is connected to the section 46, is of the largest diameter, includes the largest ports 40 and is closed by the closure member 42.

A baffle 50 is attached to the closure member 42 of the housing 36 by a bolt 52 or other equivalent means. The baffle 50 is preferably of truncated conical shape, and as will be described further hereinbelow, functions to change the direction of flash gas exiting the housing 36 by way of the ports 40 thereof.

In operation of the apparatus 10, when combustible gas flowing through the conduit 12 ignites spontaneously or otherwise, the expansion of the flash gas produced and the flame front moving through the conduit 12 cause the pressure exerted within the conduit 12 to be increased whereby the rupture panel 18 ruptures. As shown in FIG. 6, the rupture panel 18 tears along the lines of weakness created by the scores 34 and opens fully, generally without fragmentation. The rupture of the rupture disk 18 causes the flame front and flash gas to exit the conduit 12 by way of the opening 32 in the outlet flange member 22. The flash gas flows at a relatively high velocity through the opening 32 and through the flame arresting receptacle 16 by way of the elongated housing 36 to the opposite end of the housing 36 where the flash gas impinges on the closure member 42 of the housing and reverses direction. Some of the flash gas exits the housing 36 by way of the ports 40 in the sides of the housing 36 as it flows towards the closed end of the housing 36, but a major portion of the flash gas flows through the housing 36 and reverses direction prior to exiting the housing 36. This is largely due to the increasing internal diameter of the housing 36 as the distance from the inlet end 38 increases in combination with the ports 40 being of small size at the inlet end of the housing 36 and of increasing size as the distance from the inlet end increases. The flow direction reversal of the flash gas coupled with the passage of the flash gas through the ports 40 causes flame associated with the flash gas to be arrested.

The baffle 50 functions to change the direction of flash gas which exits the enlarged ports 40 in the cylindrical section 48 of the housing 36 and to thereby extinguish any flame carried outside of the housing 36. After exiting the ports 40 the flash gas is released to the atmosphere or into an enlarged container within which the apparatus 10 is disposed.

Thus, the apparatus 10 functions to vent flash gas and flame associated therewith from a vessel, conduit or other pressure system and to arrest the flame associated with the flash gas prior to releasing the flash gas to the atmosphere or other location. The apparatus 10 thereby prevents explosions and injury to equipment and personnel while safely venting an arresting flame associated with the flash gas.

The present invention, therefore, is well adapted to carry out the objects and attain the ends and advantages mentioned as well as those which are inherent therein. While numerous changes in the construction and arrangement of parts of the invention can be made by those skilled in the art, such changes are encompassed within the spirit of this invention as defined by the appended claims.

What is claimed is:

1. A flash gas venting and flame arresting apparatus for preventing damage to a closed vessel or system by flash gas formed therein, said vessel or system having an outlet connection attached thereto comprising:

pressure responsive valve means connected to said outlet connection or relieving pressure exerted thereon from within said vessel or system as a result of the presence of flash gas therein and for venting said flash gas from said vessel or system; and a flame arresting receptacle connected to said valve means external of said vessel or system for receiving said flash gas and arresting flame associated therewith prior to releasing said flash gas, said receptacle including an elongated housing having an inlet end connected to said valve means and being of generally increasing internal diameter as the distance from said inlet end of said housing increases, sides having a plurality of flash gas exit ports therein which ports generally increase in size as the distance thereof from said inlet end of said housing increases, and a closed opposite end for changing the direction of flow of flash gas which impinges thereon.

2. The apparatus of claim 1 wherein said elongated housing of said flame arresting receptacle is substantially cylindrical in shape.

3. The apparatus of claim 2 wherein said flame arresting receptacle is further characterized to include baffle means attached thereto for changing the direction of flow of flash gas exiting said flash gas exit ports of said housing.

4. The apparatus of claim 3 wherein said baffle means comprises a truncated cone shaped baffle externally connected to said closed end of said housing and extending over and around the closed end portion of said housing.

5. The apparatus of claim 1 wherein said pressure responsive valve means are comprised of a rupturable member which ruptures when a predetermined pressure differential is exerted thereon clamped between a pair of flange members.

6. The apparatus of claim 5 wherein said rupturable member is a rupture disk.

7. The apparatus of claim 5 wherein said rupturable member is a rupture panel.

8. A flash gas venting and arresting apparatus for preventing damage to a closed vessel or system by flash gas formed therein, said vessel or system having a flash gas outlet connection attached thereto comprising:

a pair of complimentary inlet and outlet rectangular flange members, the inlet flange member being connected to said flash gas outlet connection of said vessel or system;

a rectangular rupturable panel having scores formed thereon which create lines of weakness therein which ruptures and vents flash gas from said vessel or system when a predetermined pressure differential is exerted thereon sealingly clamped between said flange members; and a flame arresting receptacle connected to said outlet flange member for receiving said flash gas and arresting flame associated therewith prior to releasing said flash gas, said receptacle including an elongated housing having an inlet end connected to said outlet flange member and being of generally increasing internal diameter as the distance from said inlet end of said housing increases, sides having a plurality of flash gas exit ports therein, which ports generally increase in size as the distance thereof from said inlet end of said housing increases, and a closed opposite end for changing the direction of flow of flash gas impinging thereon.

9. The apparatus of claim 8 wherein said elongated housing is said flame arresting receptacle is substantially cylindrical in shape.

10. The apparatus of claim 9 wherein said flame arresting receptacle is further characterized to include baffle means attached thereto for changing the direction of flow of flash gas exiting said flash gas exit ports of said housing.

11. The apparatus of claim 10 wherein said baffle means comprises a truncated cone shaped baffle externally connected to said closed end of said housing and extending over and around the closed end portion of said housing.

12. The apparatus of claim 11 wherein said elongated housing is comprised of three successively connected cylindrical sections, the first section being connected to said outlet flange member, the second section being of a larger diameter than the first section and the third section being of a larger diameter than the second section.

13. The apparatus of claim 12 wherein said first cylindrical section contains a plurality of flash gas exit ports therein, the second section contains a plurality of flash gas exit ports therein of a larger size than the ports in said first section and the third section contains a plurality of flash gas exit ports therein of a larger size than the ports in said second section.

14. The apparatus of claim 13 wherein said third cylindrical section is closed by an elliptical head attached thereto.

* * * * *